Dec. 16, 1952  J. S. PACE  2,621,647
ELECTRICALLY CONTROLLED FUEL BURNING AUTOMOBILE HEATER
Filed Aug. 26, 1949  3 Sheets-Sheet 1

Inventor
Joseph S. Pace
By Clarence A. O'Brien
and Harvey B. Jacobson
Attorneys

Dec. 16, 1952  J. S. PACE  2,621,647
ELECTRICALLY CONTROLLED FUEL BURNING AUTOMOBILE HEATER
Filed Aug. 26, 1949  3 Sheets-Sheet 2
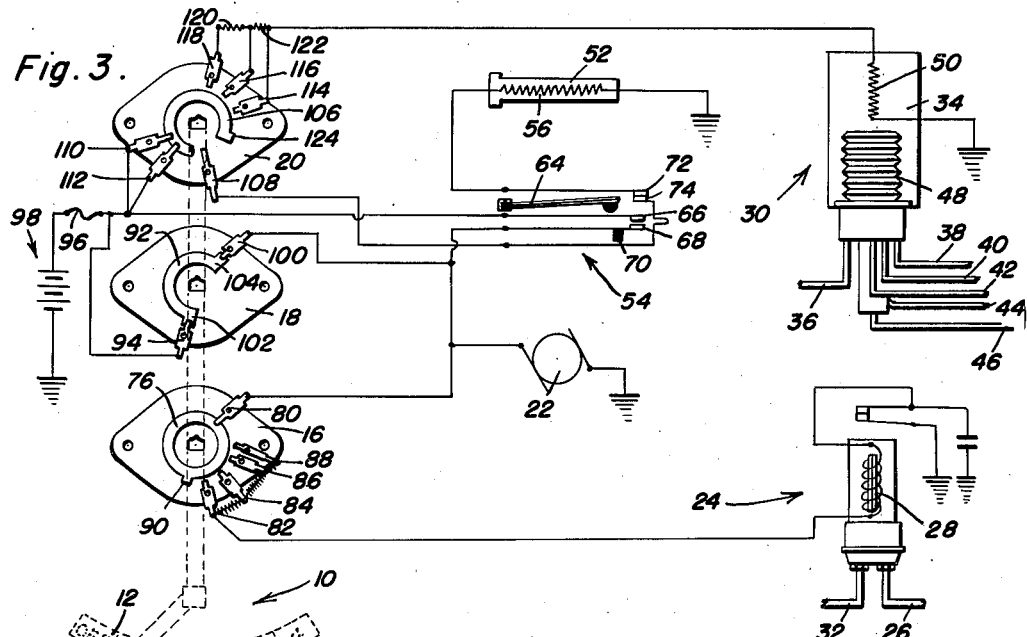
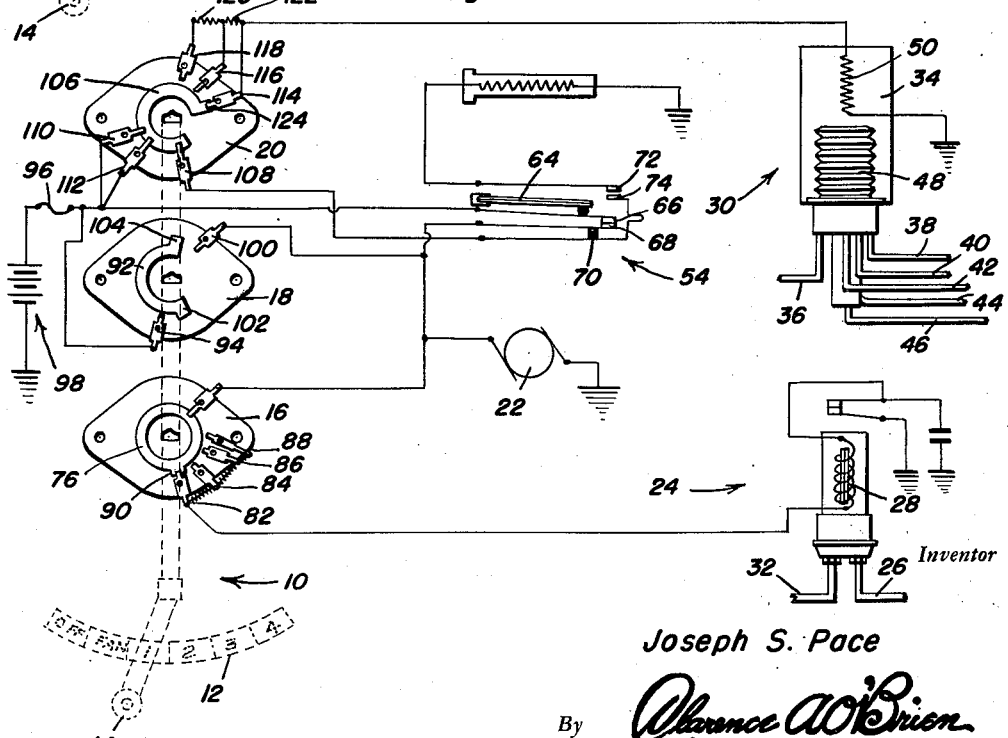
Inventor
Joseph S. Pace
By Clarence A. O'Brien
and Harvey B. Jacobson
Attorneys Dec. 16, 1952 J. S. PACE 2,621,647
ELECTRICALLY CONTROLLED FUEL BURNING AUTOMOBILE HEATER
Filed Aug. 26, 1949 3 Sheets-Sheet 3

Joseph S. Pace
INVENTOR.

BY Clarence A O'Brien
and Harvey B. Jacobson
Attorneys

Patented Dec. 16, 1952

2,621,647

UNITED STATES PATENT OFFICE 2,621,647

ELECTRICALLY CONTROLLED FUEL BURNING AUTOMOBILE HEATER

Joseph S. Pace, Shreveport, La.

Application August 26, 1949, Serial No. 112,511

2 Claims. (Cl. 126—110)

This invention relates to automobile heaters, and more particularly to an ignition and operating system for a gasoline heater for automobiles and the like.

An object of this invention is to provide an electrical actuating and operating system for an automobile heater which will prevent the fuel pump in the system from pumping gasoline into the combustion chamber of the heater when the igniter comprising one element of the system is inoperative.

This, together with the various ancillary objects which will become apparent as the following description proceeds, are attained by this actuating and operating circuit for a gasoline heater, a preferred embodiment of which has been illustrated, by way of example only, in the accompanying drawings, wherein:

Figure 3 is another schematic diagram of the electrical system of the present invention showing it in a fan-operative position;

Figure 4 is another schematic diagram of the electrical connections comprising the present invention, and showing the system in one of the operative positions.

Figure 1:
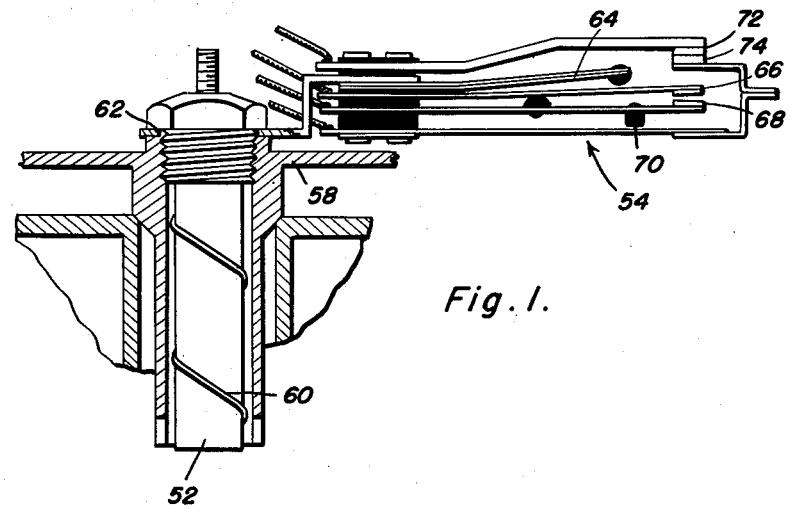
Figure 1 is a vertical sectional view of several elements of the preferred embodiment of the present invention, showing the specific relationship they bear each other.

With continued reference to the accompanying drawings, wherein like reference numerals designate similar parts throughout the various views, there are to be seen several wiring diagrams of the automobile gasoline heater, designed for 6 volt D. C. operation only, which comprises the present invention. A control head 10 is mounted on the instrument panel of the automobile. It contains a dial indicator 12 and a lever 14 for operating each of the three switches 16, 18 and 20.

The heater being, for example, model CH-1B, manufactured by Motorola, Inc., contains a motor 22 which drives two fans. One fan provides air for the combustion chamber which is completely sealed from the inside of the automobile. This fan is contained within the base of the heater and draws air from the engine compartment for combustion and also discharges the burned gases by means of an exhaust tube through the engine compartment and out of the top. The second fan 23 draws air from the interior of the car onto a grille over a cast aluminum heat exchanger 25, and then blows the heated air out from adjacent the rear of the unit. This fan may also provide air for defrosting, which may be directed over the automobile windshield by means of hoses and nozzles that may be provided as desired.

A fuel pump 24 is provided which draws gasoline through inlet line 26. It is a diaphragm type and is operated by an electric solenoid 28. The pump is self-priming and directs the gasoline to a fuel metering device 30 through outlet 32. The fuel metering device 30 is located inside the heater and consists of a regulator 31, and a selector assembly 34. The purpose of the regulator is to maintain a constant pressure of fuel at the selector. The regulator consists of a diaphragm, a needle valve and spring, and a screw for adjustment of pressure for correct flow. In order to maintain the constant fuel pressure at the selector, the needle valve, when required, opens or closes, causing the pump to deliver more or less fuel. The gasoline passing through the regulator from tube 32 enters the selector through a tube 36. The selector 34 delivers the proper amount of fuel through five small tubes 38, 40, 42, 44, and 46 to a burner block which has five separate burners where the fuel is vaporized for combustion. Tube 46, the pilot line, provides fuel for original ignition and then maintains flow for a constant pilot flame. This constant pilot flame is the means for igniting the fuel as required for each of the other four burners in the burner block. The pilot flame continues to burn as long as the heater is on. All burners, including the pilot, go out when the heater is turned off. Tubes 38, 40, and 42 are controlled by needle valves which are operated by a temperature-sensitive, vapor-filled bellows 48. The remaining tube 44 is a seepage line and normally delivers a small amount of gasoline, and also bleeds any small amount of air that may enter the system so that the pilot tube 46 may maintain an uninterrupted flow. At minimum heat output of the heater, the pilot and seepage tubes are delivering fuel. At maximum heat output, fuel is being delivered by all of the five tubes. The seepage tube 44, when bleeding air, has an interrupted flow of fuel.

The heater is adapted to automatically adjust itself to keep the air in an automobile at a desired level corresponding to one of the four numbered positions on the indicating dial. The level is maintained by the production of heat corresponding inversely as necessary to the temperature of the air in the car. This automatic adjustment or modulation of output is made through the action of the temperature-sensitive bellows 48. The bellows is so located that the air drawn into the heater passes over its surface. When the air temperature rises, unless heat is required, the bellows expands and closes the selector needle valves in order for the selector to deliver less gasoline through the tubes 38, 40, and 42 to the burner block for combustion. When the air temperature falls and more heat is required, the bellows contracts and the selector delivers more fuel. By means of a small heating resistor or resistance coil 50 positioned above the bellows, the air passing over the bellows may be preheated. This preheating causes the bellows to expand and reduce fuel flow. The amount of preheating depends upon which one of the numbered operating levels is selected and the means for controlling this preheating will be henceforth described.

Attention is now primarily directed to Figure 1, wherein is shown in actual position the igniter 52 and the thermostatic switch generally designated by reference numeral 54. The igniter 52 is an assembly containing a tube 53 inside of which is a ceramic insulator and a resistance heating element 56. The igniter assembly screws into a fitting in the center of the burner plate and shield assembly, designated by reference numeral 58. The igniter is adapted to receive current as soon as the heater is turned on, the resistance heater element 56 of which gets hot to vaporize and ignite the fuel from the pilot line 46. By the action of the thermostatic switch 54, the igniter 52 is subsequently removed from the circuit. A spiral wire 60 is fastened to the outside of the igniter tube, to aid in the vaporization of the fuel.

The original ignition within the burner block or combustion chamber 59 of the heater is obtained by the use of the igniter 52 which vaporizes and ignites the fuel from the pilot tube 46. The igniter is mounted through an aperture 62 in the bimetallic strip 64 of the thermostatic switch 54. About one minute after current passes through the igniter, it will reach ignition temperature. Additionally, heat will be transferred to the bimetallic strip of the thermostat to actuate contacts 66 and 68 thereof by pressing them together, thus to subsequently connect the motor 22 and the fuel pump 24 in the circuit. The fuel discharged by pump 24 then passes through the tube 46 into the burner block 58, where it will contact the hot igniter, and in about five seconds or so the additional heat resulting from the combination of the fuel will cause the bimetallic strip 64 to further depress the contacts 66 and 68, together with the insulating lug 70 thereon, which will cause the contacts 72 and 74 to open. This will, of course, break the circuit through the igniter.

To stop the heater, the manual switch or lever 14 is then turned to an "off" position which will open the pump circuit due to the operation of the switch 16 to be henceforth described. However, this will maintain the motor 22 in the circuit through the switch 20 and the contacts 66 and 68. Until the bimetallic thermostat 64 has cooled off sufficienctly to allow the parting of contacts 66 and 68, the motor will keep running. This will allow the cooling of the combustion chamber and removal of the burning gases therefrom. After several minutes, the heater cools off sufficiently for the contacts 66 and 68 to open, thereby shutting off the motor. This is the over-run cycle which makes the heater ready for its next operation.

Figure 2:
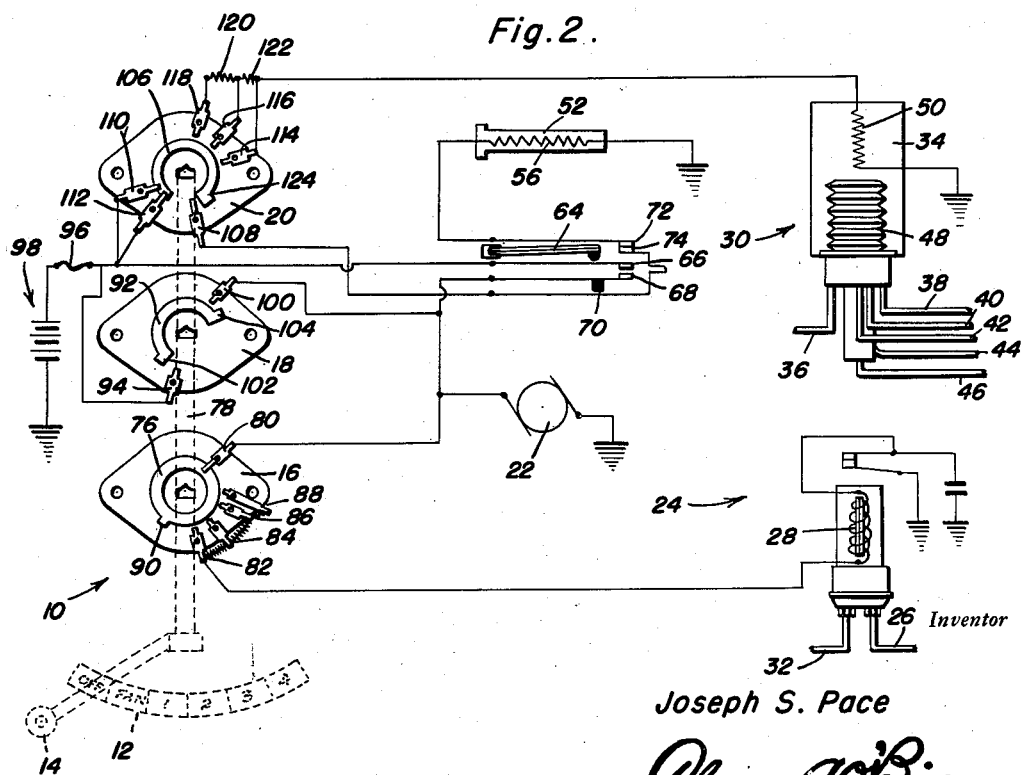
Figure 2 is a schematic diagram of the actuating and operating electrical system of the present invention showing it in the "off" position.
Figure 5:
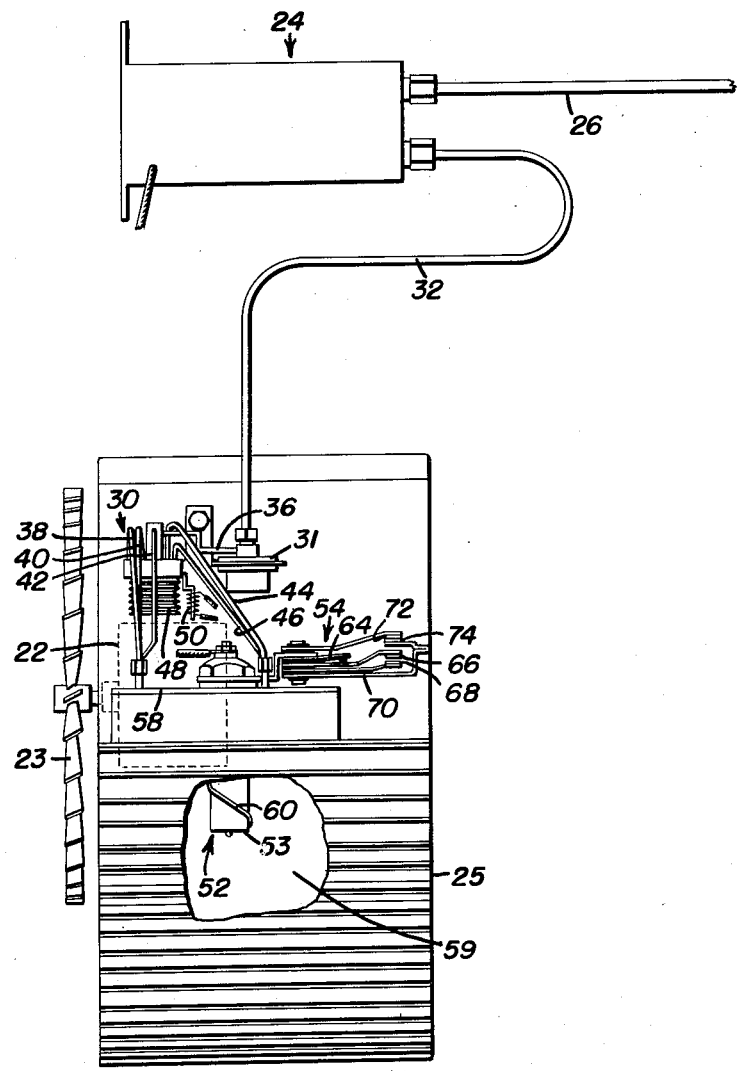
Figure 5 is a diagrammatic view of the heater assembly.

Referring now to Figures 2 through 4, it will be seen that upon switch 16 there is a first ring conductor 76 rotatably mounted thereon in engagement with the bar 78 connected to the lever 14. A contact member 80 engages the ring 76 at all times and is connected through suitable conductors to the motor 22. A plurality of contacts 82, 84, 86, and 88 are mounted on the switch 16 and are selectively engaged by the ring 76, since the projection 90 will engage one of these contacts upon proper rotation thereof. Each of the contacts 82, 84, 86, and 88 is connected to the solenoid 28 of the fuel pump 24 and will actuate the fuel pump. These contacts may have connected thereto a resistor to determine the amount of current flow to the solenoid 28.

A second switch 18 is provided and has a second conducting ring 92 rotatably journaled thereon in engagement with the rod 78. A contact 94 is mounted on the switch and is connected through a suitable fuse 96 to a source of current, generally indicated by reference numeral 98. Another contact 100 is secured on the switch 18 and is connected through a suitable conductor to the motor 22 and the contact 68. A pair of oppositely disposed projections 102 and 104 are provided on the ring 92 and simultaneously engage the contacts 94 and 100.

A third switch plate 20 is provided which has an annular ring 106 mounted thereon in engagement with the rod 78 and selectively engages a contact 108 secured to the plate and electrically connected to the contact 74. By means of a single contact or a pair of contacts, such as indicated at 110 and 112, the ring 106 is electrically connected to the source of current 98. A series of contacts 114, 116, and 118 are secured to the plate 20 for selective engagement by the ring 106. These contacts are connected to the resistance coil 50 and resistances 120 and 122 are placed in the circuit to effect a change in the current delivered to resistance coil 50. The contacts 108, and 114, 116 and 118 are selectively engaged by the projection 124 on the ring 106.

Referring now to Figure 2 particularly, it can be seen that when the control lever 14 is in the "off" position as shown on the dial 12, all the electrical circuits are open when the heater is cold. When the heater is warm, contacts 66 and 68 are connected, thus causing a circuit through the motor 22 from the source of current 98, which will cause the motor to run until the contacts 66 and 68 are parted upon cooling of the bimetallic member 64 and the cooling of the combustion chamber.

Reference to Figure 3 will make it evident that when the manual control lever 14 is turned to the "fan" position on the indicating dial, the switch 18 will cause a by-pass of the contacts 66 and 68 and direct current to the motor for the fan.

In an "on" position, as is shown in Figure 4, the igniter 52 is connected through thermostat 54 and contacts 72 and 74 to the source of current 98. The bellows preheating resistor 50 is connected to the battery through one of the series of contacts 114, 116, or 118, ring 106 and the suitable conductors. As is shown in Figure 4, the contacts 72 and 74 have been parted so that the igniter has been disconnected from the circuit. The fuel pump 24 is connected to contact 82 on switch 16 and thence through the battery or source of power 98. If the manual lever 14 were moved to the position indicated at 2, 3 or 4 on the indicating dial 12, the ring 106 would subsequently engage contacts 116, 118, or none at all to increase the resistance across the resistance coil 50 to decrease the amount of heat generated therein. This will increase the flow of fuel through the selector. Additionally, the contact 90 will selectively engage contacts 82, 84, 86, or 88 in that order so as to determine the amount of fuel pumped by the fuel pump 24 due to the actuation of the solenoid 28 thereof.

It can be seen, however, that unless the resistance coil 56 in the igniter 52 is supplied with a current to heat it, the fuel pump 24 will not be connected to the source of current 98 as the switch contacts 66 and 68 will remain open. Accordingly, no fuel will be injected into the combustion chamber to cause the dangerous and unpleasant overflow thereof which will cause gasoline to drip on the floor board of the automobile.

Since, from the foregoing, the construction and advantages of this operating circuit for an automobile heater is readily apparent, further description is believed to be unnecessary.

However, since numerous modifications and equivalents will readily occur to those skilled in the art after a consideration of the foregoing specification and accompanying drawings, it is not desired to limit the invention to the precise embodiment shown and described, except as required by the scope of the appended claims.

Having described the invention, what is claimed as new is:

1. A gasoline heater and control system including an electrically operated fuel pump, a combustion chamber, an electrically operated fuel metering device connected to said fuel pump for dispensing fuel into said combustion chamber, temperature responsive means for controlling said fuel, metering device an electrically operated blower for moving the air to be heated over said temperature responsive means, electrical means for preheating the air which passes over said temperature responsive means, an electrically operated igniter extending into said combustion chamber, a first normally open switch, a second normally closed switch, means responsive to a predetermined temperature of said igniter for closing said first switch, means responsive to a second relatively higher predetermined temperature caused by the burning of fuel in said combustion chamber for opening said second switch, a source of power; a first conductor means electrically connecting said first switch to said source of power and to said blower, a second conductor means electrically connecting said first switch to said fuel pump whereby said blower and fuel pump are actuated when the igniter temperature reaches said predetermined temperature, a third conductor means electrically connecting said second switch to said source of power and to said igniter whereby said igniter is de-energized when the temperature in said combustion chamber reaches said second relatively higher predetermined temperature, a manually operable control head movable from an "off" position to a first "heating" position, said control head including a fuel pump control switch serially connected in said second conductor means to selectively connect said pump to said first thermo-responsive switch when said control head is moved from its "off" position to its first "heating" position, said head including an igniter control switch serially connected with said second switch in said third conductor means to electrically connect said igniter to the source of power when said control head is in its "heating" position, and means for connecting said preheating means to said source of power.

2. A gasoline heater and control system including an electrically operated fuel pump, a combustion chamber, an electrically operated fuel metering device connected to said fuel pump for dispensing fuel into said combustion chamber, temperature responsive means for controlling said fuel, metering device an electrically operated blower for moving the air to be heated over said temperature responsive means, electrical means for preheating the air which passes over said temperature responsive means, an electrically operated igniter extending into said combustion chamber, a first normally open switch, a second normally closed switch, means responsive to a predetermined temperature of said igniter for closing said first switch, means responsive to a second relatively higher predetermined temperature caused by the burning of fuel in said combustion chamber for opening said second switch, a source of power; a first conductor means electrically connecting said first switch to said source of power and to said blower, a second conductor means electrically connecting said first switch to said fuel pump whereby said blower and fuel pump are actuated when the igniter temperature reaches said predetermined temperature, a third conductor means electrically connecting said second switch to said source of power and to said igniter whereby said igniter is de-energized when the temperature in said combustion chamber reaches said second relatively higher predetermined temperature, a manually operable control head movable from an "off" position to a first "heating" position, said control head including a fuel pump control switch serially connected in said second conductor means to selectively connect said pump to said first thermo-responsive switch when said control head is moved from its "off" position to its first "heating" position, said head including an igniter control switch serially connected with said second switch in said third conductor means to electrically connect said igniter to the source of power when said control head is in its "heating" position, and means for connecting said preheating means to said source of power, a blower control switch operated by said control head and connected in electrical parallel with said first thermo-responsive switch, said control head being movable into a "fan" position intermediate said "off" position and said "heating" position to close said blower control switch and actuate said blower.

JOSEPH S. PACE.

REFERENCES CITED

The following references are of record in the file of this patent:

UNITED STATES PATENTS

| Number | Name | Date |
|---|---|---|
| 2,308,887 | McCollum | Jan. 19, 1943 |
| 2,364,214 | Hess et al. | Dec. 5, 1944 |
| 2,401,393 | Wakefield | June 4, 1946 |
| 2,482,551 | Korsgren | Sept. 20, 1949 |
| 2,484,602 | Aubert | Oct. 11, 1949 |